Dec. 9, 1952             L. B. FORMAN             2,620,680
AUTOMOTIVE TRANSMISSION AND CONTROL SYSTEM THEREFOR
Filed Dec. 2, 1947             4 Sheets-Sheet 1
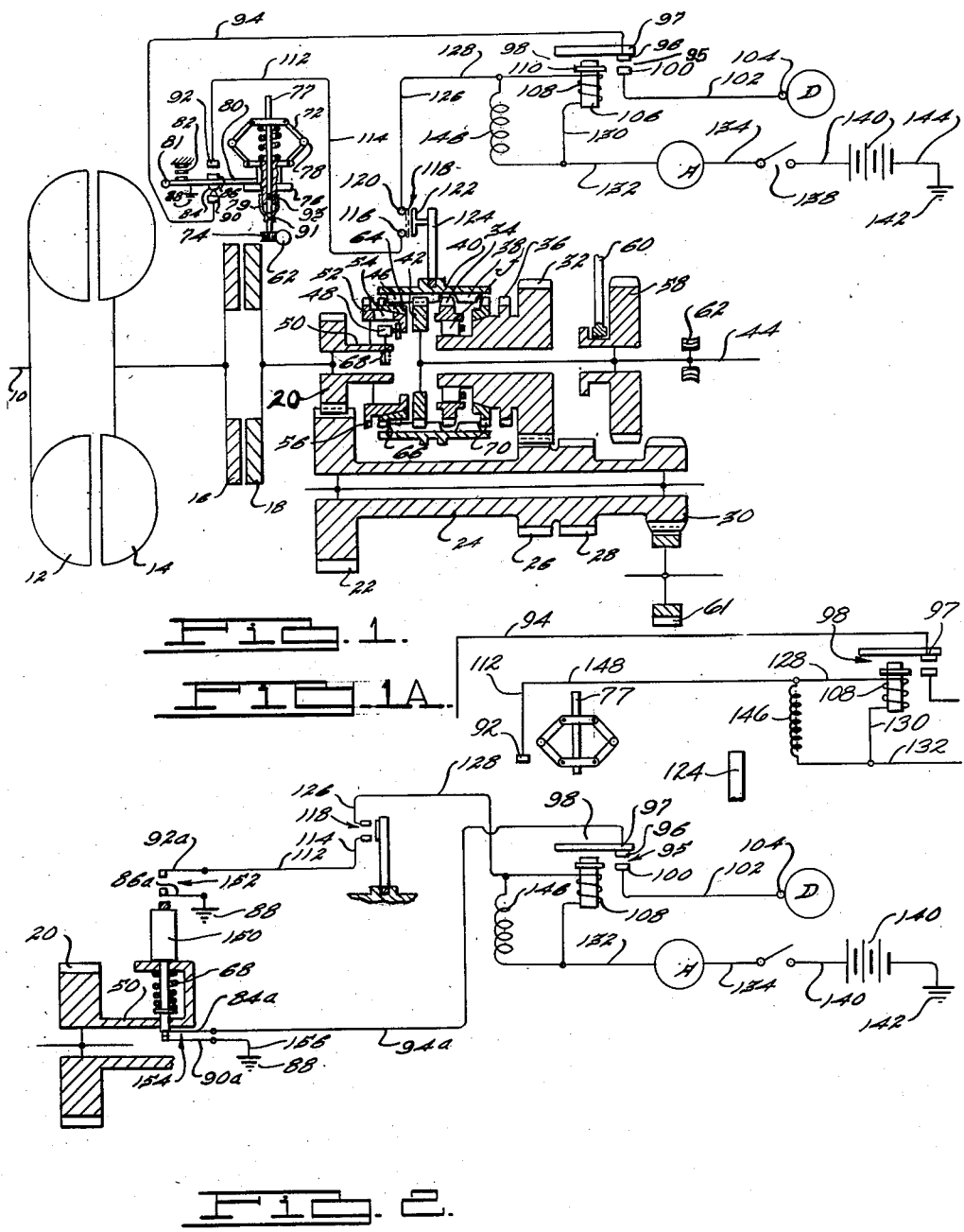
INVENTOR.
Louis B. Forman
BY
Harness & Harris
ATTORNEYS.

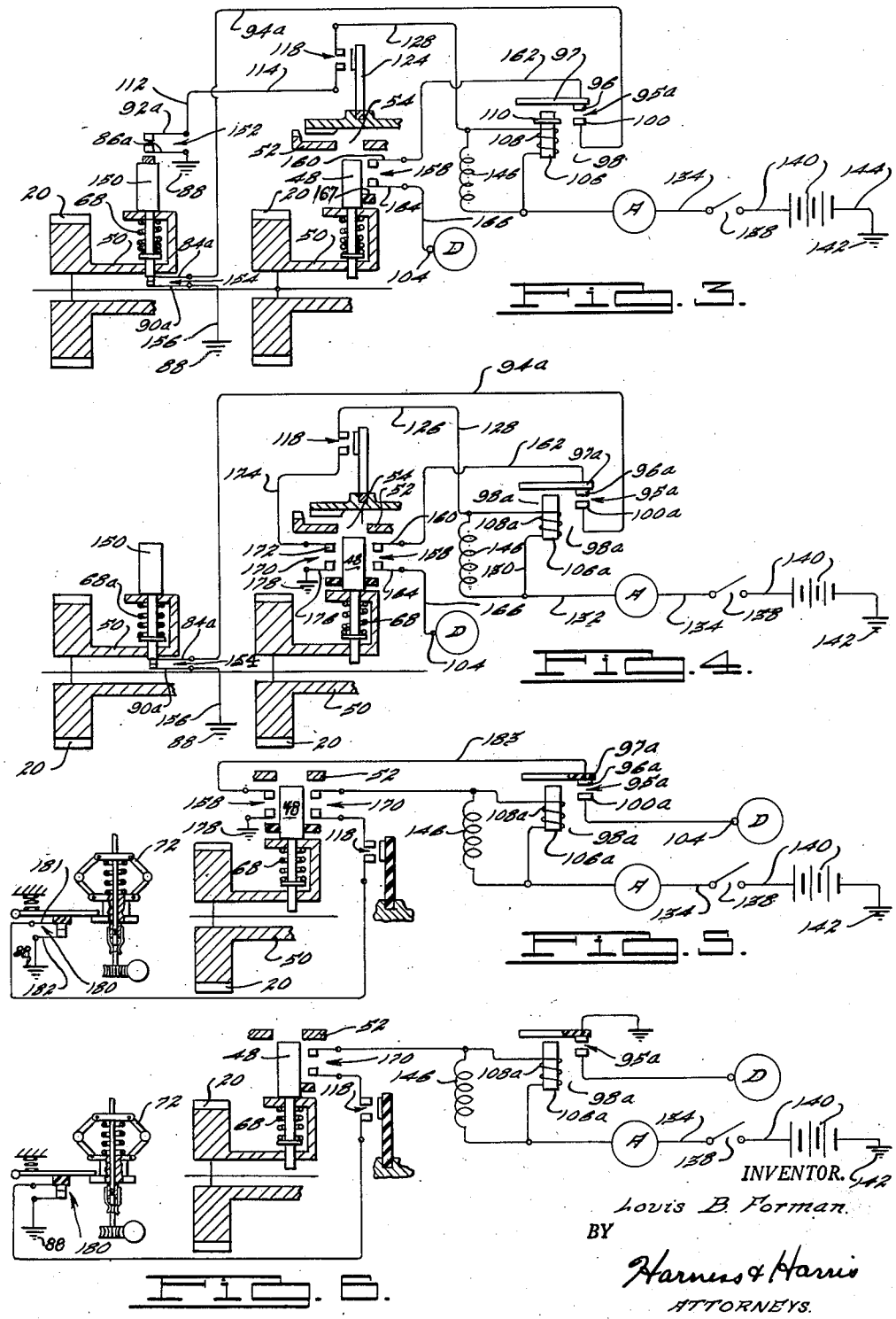

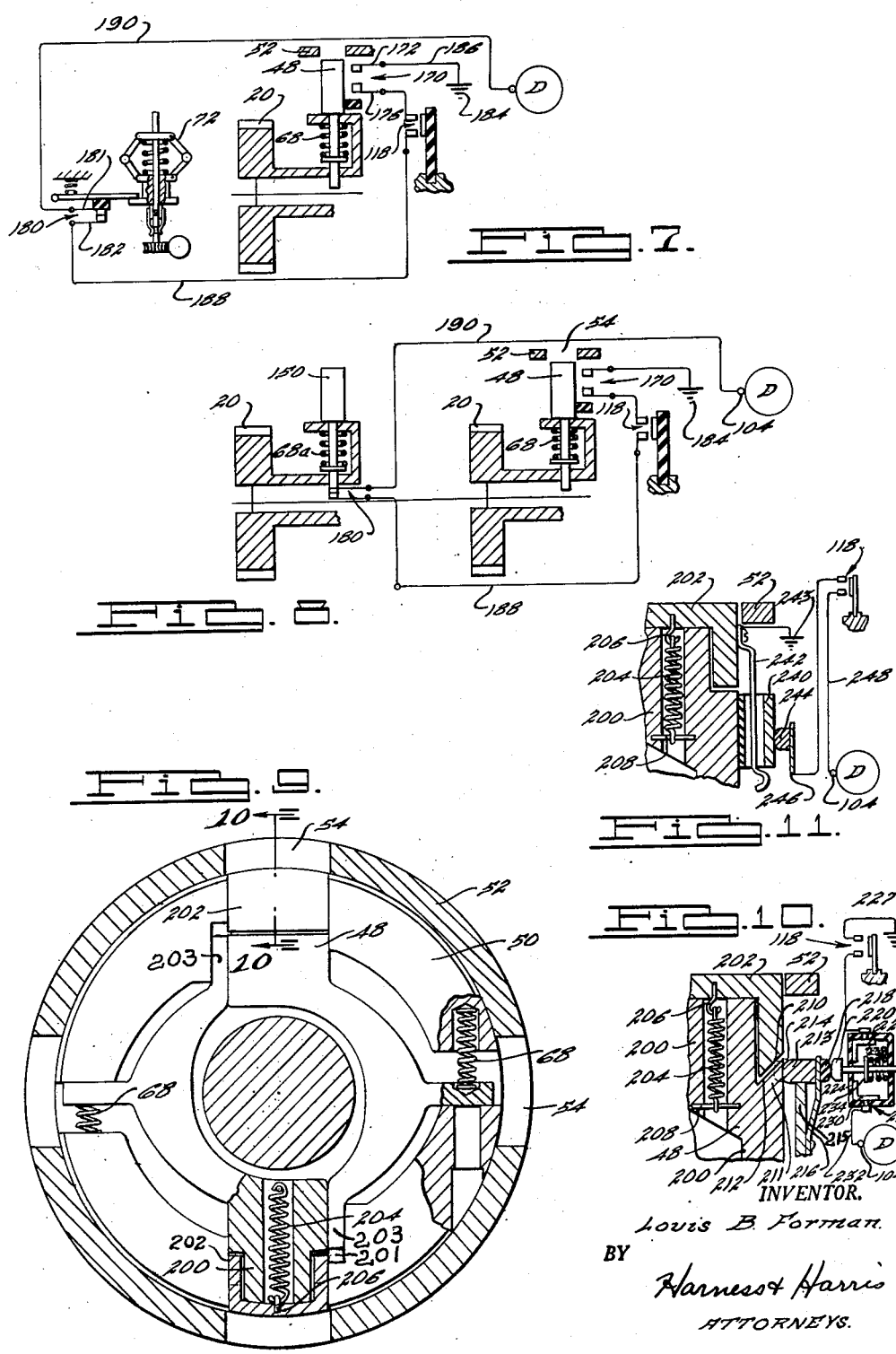

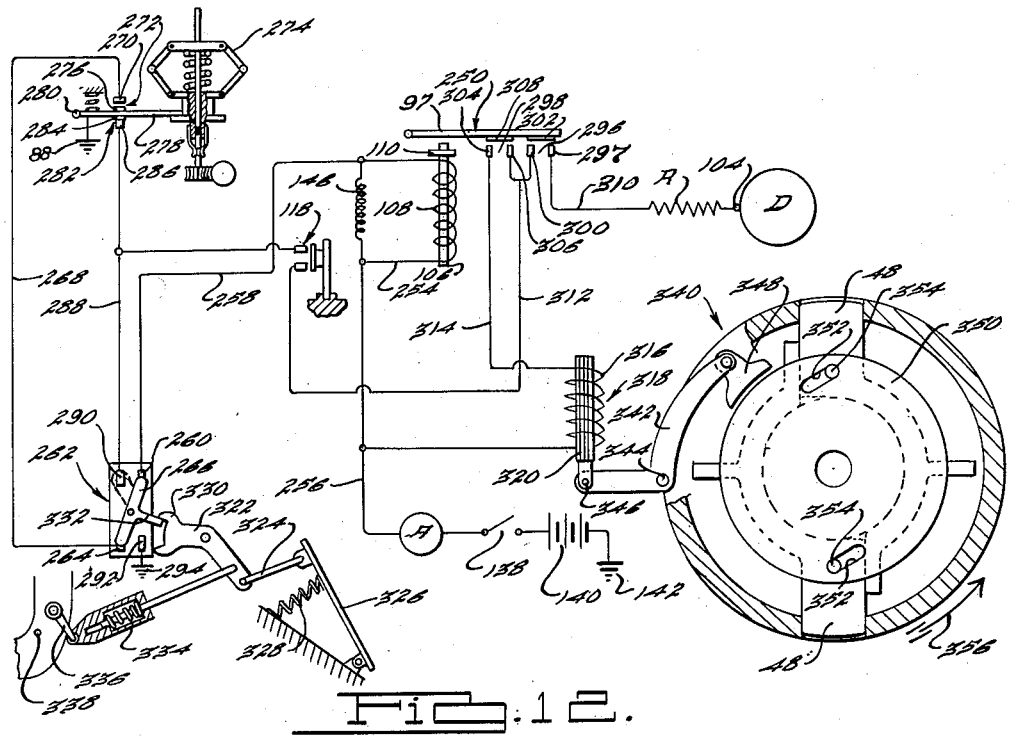
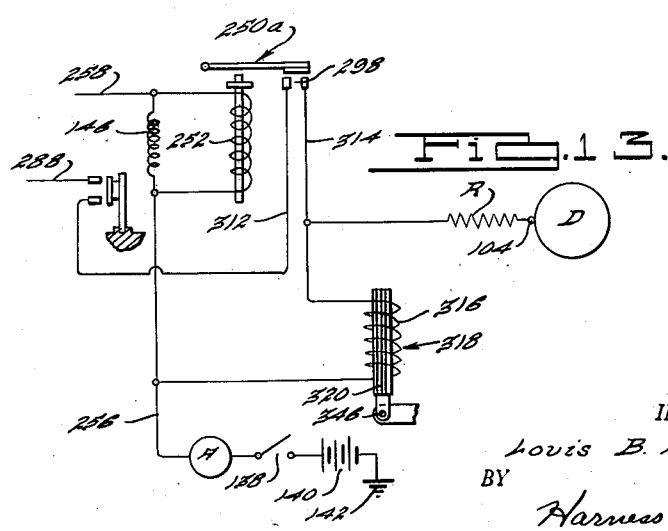

Patented Dec. 9, 1952

2,620,680

UNITED STATES PATENT OFFICE 2,620,680

AUTOMOTIVE TRANSMISSION AND CONTROL SYSTEM THEREFOR

Louis B. Forman, Detroit, Mich., assignor to Chrysler Corporation, Highland Park, Mich., a corporation of Delaware Application December 2, 1947, Serial No. 789,159

43 Claims. (Cl. 74—472)

This invention relates to control systems and mechanism for automotive transmissions especially to a system and electro-mechanical means for controlling speed ratio changes in change speed mechanism of semi-automatic transmissions, for instance, for controlling disengagement of tooth or dog clutches therefor.

More particularly my invention relates to a control system and electrically operated means for controlling the disengagement of centrifugal force type pawl or dog clutches.

It has been proposed as in the application of Robert W. Wolfe, Serial No. 780,011, filed October 15, 1947, to provide a manually selective semi-automatic transmission for relatively low priced automobiles incorporating a centrifugal force type pawl clutch and an overrunning clutch to provide automatic changes in speed ratio drive between a starting gear ratio and a cruising direct drive ratio.

Many car drivers dislike driving at relatively slow speeds, for instance, second speed ratio for long periods of time (as in funeral processions) and in such instances it becomes desirable that the centrifugal pawl clutch should be engaged to establish direct drive ratio at a relatively low vehicle speed, for instance, 12 M. P. H. corresponding approximately to 600 R. P. M. of the engine in direct drive (3.9 axle). By reason of shift in the center of gravity of the pawls the pawl disengagement may normally be expected to occur at a somewhat lower vehicle speed, for instance, around 10 or 11 M. P. H. (500 R. P. M.) which value will generally depend upon the difference between the pawl spring load built-up in engagement of the pawls and the increase in centrifugal force resulting from outward movement of the center of gravity of the pawls.

With a normal free engine idle speed of between 450 to 500 R. P. M. and in coming to a stop slowly, the pawls will be under coast torque above the disengaging speed of 10 to 11 M. P. H. (approximately 500 R. P. M. engine speed) and at this disengaging speed there will theoretically be no torque on the pawls and they may consequently disengage. However, when coming to a stop more rapidly, the engine may not have had sufficient time to slow down to idle speed, that is, the pawls may be under drive torque at 12 M. P. H. where the pawls are not trying to disengage, and this drive torque may persist when coming down in car speed to a stop and will remain while the vehicle is at a standstill (because of coupling drag torque) as long as the master clutch is engaged. Consequently, the pawls may remain in engagement and the vehicle transmission will remain in direct drive since the pawls find it difficult to disengage while undergoing any torque.

The problem may be even more acute where the pawls would engage at vehicle speeds corresponding to 600 R. P. M. of the pawl carrier and disengage at 500 R. P. M. but where the vehicle is provided with a fast idle speed (corresponding to 700 to 1,000 R. P. M. of the pawl carrier) under control of an automatic choke, desired by many drivers for warming up the engine to facilitate starting in slow speed (second) ratio drive, or in such cases where a fast, hot idle speed of approximately 575 R. P. M. of the engine is provided. Experience has indicated that either of these conditions will substantially always prevent pawl disengagement.

In order to attain pawl disengagement under any of the enumerated conditions, I provide control means for obtaining the necessary diminution of torque required for pawl disengagement. In general, I provide some means which by way of example, may be a speed governor, a dummy pawl, or a clutch pawl itself together with suitable electrical circuiting means for interrupting the ignition system of the vehicle as by grounding the primary coil of the distributor to thereby obtain a torque reversal necessary for pawl disengagement, such preferably taking place at the proper moment when the pawls of the clutch, were it not for the torque application thereon, would become disengaged by the pawl retracting springs. The torque diminishing means is further arranged with suitable control for maintaining the interruption of the ignition system for a sufficient time to disengage the pawls under all operating conditions. This time element will generally be less than half a second. I also propose to employ the torque diminishing mechanism in timed relationship with a mechanical pawl retracting mechanism whereby the interval of time for torque interruption may be lessened and a positive pawl retracting device be provided.

Accordingly, the principal object of my invention is to provide means for relieving torque application on the pawls of an engaged centrifugal force type pawl clutch to facilitate disengagement of the clutch at such times as the pawls would normally become retractable were it not for such torque application.

Another object of my invention is to provide means as aforesaid for relieving the torque application on the pawls for a sufficient interval of time to insure disengagement of the clutch.

A further object is to provide means for relieving the torque application on the pawls of a centrifugal force type pawl clutch and which utilizes a dummy pawl to control the time when torque diminution or reversal should occur.

An additional object is to provide a system and/or mechanism for relieving the torque application of the pawls of a centrifugal force type pawl clutch and which utilizes the pawls of the clutch themselves for timing such action.

A further object is to provide a mechanism as in the preceding paragraph wherein a centrifugal force type pawl member is utilized for controlling the time of diminution of torque on the pawls of the clutch and the duration thereof.

An additional object is to provide torque relieving mechanism of the aforesaid character under further control of a manual change speed selector and which mechanism may be operable to obtain torque diminution only when the selector calls for a drive wherein the pawls of the clutch are engageable.

Another object is to provide a mechanism for controlling the disengagement of a centrifugal force type pawl clutch by relieving the torque application on the pawls at such time as they would normally become disengageable and to substantially concurrently therewith effect a forcible retraction of the pawls.

Other objects and advantages of my invention will appear from the following description in conjunction with the drawings wherein:

Fig. 1 is a schematic view of a control system and mechanism of my invention as applied to a three-speed forward and reverse transmission embodying a centrifugal type pawl clutch for effecting changes in speed ratio drive between second speed and direct;

Figure 1A illustrates a portion of the circuiting of Figure 1 modified to omit the manual selector switch of Figure 1.

Fig. 2 is a modification of the control system in a circuiting similar to that of Fig. 1;

Figs. 3, 4, 5, 6, 7, and 8 are further modifications of the control system and mechanism employed in my invention;

Fig. 9 is a section through the centrifugal pawl clutch mechanism of the transmission of Fig. 1 showing a modified form of pawl;

Figs. 10 and 11 are further modifications of my invention disclosing control circuiting and mechanism as applied to a pawl clutch of the type in Fig. 9; and Figs. 12 and 13 illustrate a form of my invention embodying control circuiting and mechanism for relieving the torque application on the pawls of the clutch and for forcibly retracting the pawls.

Referring to the various figures, especially to Fig. 1 wherein an automotive transmission to which the various forms of my invention may be applied is illustrated, the numeral 10 represents the drive shaft of a fluid power-transmitting device such as a fluid coupling which shaft is connected through suitable means, not shown, to the engine crankshaft. The shaft 10 drives the impeller 12 of the fluid coupling and the impeller through its vaned structure drives a runner member 14, which is directly connected to the input member 16 of a master clutch. The master clutch has an output member 18 which drives the input or drive pinion 20 of a change speed mechanism having three speeds forward and reverse. The pinion 20 is constantly in mesh with a countershaft gear 22 forming part of a gear cluster 24 having a second speed pinion 26, a low speed pinion 28 and reverse pinion 30. The second speed pinion 26 is constantly in mesh with a second speed gear 32 which drives a clutch member 34 through a one-way coupling J. The gear 32 carries a toothed clutching member 36 which is interengageable with the rearward set of teeth 38 of a shiftable clutch sleeve 40 drivingly connected to a hub member 42 splined or otherwise fixed to an output shaft 44. Engagement of the clutch sleeve 40 with the hub 42 is through a forward set of teeth 46.

The pinion 20 supports a plurality of radially movable dogs or pawls 48 on the rearwardly projecting carrier portion 50. Journalled on the portion 50 is a floating pawl-receiving shell 52 having a plurality of slots or windows 54 for receiving the pawls in response to outward movement of the pawls under centrifugal force when the relative speeds of the shell 52 and the pawls are synchronous. The shell member 52 is further provided with clutching teeth 56, which are adapted to be engaged by the teeth 46 of the sleeve 40.

Slidably but non-rotatably journalled on the driven shaft 44 is a low speed and reverse gear 58, which is shiftable forwardly through the manual shift member or yoke 60 to engage the low speed pinion 28 or rearwardly to engage a reverse idler 61 which is in constant mesh with pinion 30. Also fixed to the shaft 44 is a governor drive gear 62.

The clutch sleeve 40 and the gear 58 are shown in neutral position no drive being then possible through the transmission. In order to obtain low speed drive ratio, the gear 58 is manually shifted forwardly to engage the pinion 28 and upon engagement of the master clutch, a drive will be established through the elements 10, 12, 14, 16, 18, 20, 22, 28, 58, 44.

Reverse drive will be obtained by shifting the gear 58 rearwardly to engage the reverse idler 61 and upon engagement of the master clutch a drive will be established through the elements 10, 12, 14, 16, 18, 20, 22, 30, 61, 58, 44. It will be understood that in low speed and reverse drives the clutch sleeve 40 will be maintained by suitable means in neutral position.

For all speeds above low speed ratio drive, the clutch sleeve 40 must be operated out of its neutral position, the gear 58 being first moved to its neutral position. Second speed forward may be obtained in a freewheel drive by shifting the sleeve 40 forwardly to engage the teeth 46 with the clutch teeth 56 of the shell 52 and to simultaneously engage the teeth 38 of the clutch sleeve with the clutch teeth 34 of the one-way coupling J. During this operation the teeth 46 of the sleeve will remain engaged with the hub 42. Moreover, a synchronized shift will be possible because of the presence of a blocker synchronizing ring 64. The facing ends of the teeth of the ring 64 and of the clutch sleeve are chamfered to effect the synchronizing action. This shift may be effected with disengagement of the master clutch and when the same has been reengaged, a drive in second speed freewheel ratio will be established through the elements 10, 12, 14, 16, 18, 20, 22, 26, 32, J, 34, 38, 40, 46, 42, 44. At some predetermined vehicle speed in second speed freewheel drive, for example, 12 M. P. H., the pawls 48 will move outwardly by centrifugal action in opposition to pawl-retracting or governor springs such as the springs 68 shown in Fig. 9 and upon throttle closing movement of the accelerator pedal to permit the pawl carrier 50 to become synchronized with the shell 52 engagement of the pawls will take place to establish the transmission in direct drive. Upon subsequent throttle opening movement of the accelerator, forward drive in direct will be obtained through the elements 10, 12, 14, 16, 18, 20, 48, 52, 56, 46, 40, 42, and 44.

A two-way or positive drive in second speed drive ratio may be obtained by releasing the master clutch and shifting the clutch sleeve 40 rearwardly through the blocker synchronizing ring 70 to engage with the clutch teeth 36 of the second speed gear 32. Upon re-engagement of the master clutch and throttle opening movement of the accelerator drive in two-way second will be established through the elements 10, 12, 14, 16, 18, 20, 22, 26, 32, 36, 38, 40, 42, and 44.

When the transmission is established in direct drive a downshift to freewheel second will become possible when the speed of the vehicle has dropped to the disengaging speed of the pawls 48 generally corresponding to a vehicle speed of between 10 and 11 M. P. H. in direct drive and an engine speed of 500 R. P. M. However, as previously pointed out, it sometimes becomes difficult to obtain retraction of the pawls to effect a downshift by reason of torque applied between the pawls and the shell of the centrifugal device, for instance, due to the high idle speed of the engine at the time that the downshift is desired or due to making a fast stop of the vehicle such that drag torque is applied to the pawls through the fluid coupling by the engine so long as the master clutch remains engaged even though the engine is at idle speed.

In order to relieve the torque application on the pawls, that is, reduce the same an amount sufficient to enable the springs 68 of Fig. 9 to retract the pawls to effect a downshift to freewheel second ratio drive, I have provided mechanism in my shift control system for interrupting the engine ignition system. Moreover, I have provided mechanism and circuiting which may effect ignition interruption at the moment when the pawls 48 would normally become disengaged by the springs 68 were it not for the torque application upon them. In addition controls are provided whereby interruption of the ignition may be maintained for a sufficient interval usually between $\frac{3}{10}$ to $\frac{5}{10}$ of a second to allow the pawls to retract.

In Fig. 1 there is shown a vehicle speed responsive governor 72 driven by the gear 62 of the transmission through a pinion 74 and having a collar 76 which reciprocates axially on a shaft 77 at a predetermined point in response to centrifugal movement of the weights 78 of the governor, the breakaway of the collar being under control of a detent 79. The collar 76 actuates a lever 80 fulcrumed at the point 81, this lever being resiliently biased by a spring 82 into constant engagement with the lower flange of the collar 76 of the governor. The lever 80 carries contacts 84, 86, each connected to a ground 88 through the lever 80. The governor also has a fixed contact 90 which is engageable by the contact 84 at or below the vehicle speed at which the pawls 48 are to be disengaged from the shell 52 for effecting a downshift in the transmission. Preferably the contact 90 will be engaged by the switch contact 84 at a vehicle speed at which the pawls would normally become retracted by the springs 68 of Fig. 9 were there no torque application on the pawls. The switch contact 86 in turn is adapted to engage the fixed switch contact 92 at or above a vehicle speed at which the pawls 48 are engageable. Preferably in order to provide direct drive at low car speeds these contacts will be closed at approximately 12 M. P. H. in second speed ratio drive. When the transmission is in neutral the contacts 84, 90 will, as shown, be closed. When drive is established the governor eventually reaches its upper critical speed aforesaid and detent 79 will release from detent groove 91 with which it is engaged and allow switch contacts 86, 92 to close and the detent to engage in a second groove 93. When the governor slows down to the lower critical speed the detent 79 will release from groove 93 thereby causing switch contacts 86, 92 to open and contacts 84, 90 to close.

The contact 90 of the governor is connected by a conductor 94 with a switch 95 having a contact 96 mounted on the armature 97 of a measured time delay relay generally designated by the numeral 98. This relay has a second switch contact 100 connected by a conductor 102 with the primary coil terminal 104 of a distributor D of the engine ignition system. The relay has a core member 106 which is energized by a winding 108, and has a short-circuited coil 110 to which reference will hereinafter be further made. The contact 92 of the governor is connected by conductors 112, 114 with a contact 116 of a manually operable switch generally designated by the numeral 118. This switch has a second contact 120 and is closed by a bridge piece 122 which simultaneously contacts the contacts 116, 120. The bridge piece is carried by a member of the manual selector mechanism which may, for example, be the shift sleeve yoke member 124. The winding 108 connects by conductors 130, 132 with one side of an ammeter A. The ammeter is connected in series by a conductor 134 with the ignition switch 138. One side of the ignition switch connects by a conductor 140 with a terminal of a source of power such as a storage battery 140, the other side of the battery being grounded as at 142 by a conductor 144. In parallel with the relay winding 108 is an anti-stall coil 146 which functions to protect the engine against stalling at low car speeds.

As previously stated, the contacts 86, 92 of the governor will preferably close at a vehicle speed at which the pawls 48 of the centrifugal clutch will become engaged. Since at this time the ignition switch 138 and the manual switch 118 will be closed, a circuit will be established between the governor switch 86, 92 and the source of power 140 through the conductors 112, 114, switch 118, conductors 126, 128, winding 108, conductors 130, 132, ammeter A, conductor 134, ignition switch 138, and conductor 140. The contact 86 being grounded at 88, and the battery being grounded at 142, current will now flow through the relay winding 108 to energize the core 106 and pull the relay armature 97 into contact with the core 106 to close the relay contacts 96, 100 thereby forming a continuous circuit from the governor contact 90 through the conductor 94, contacts 96 and 100 and conductor 102 to the primary winding terminal 104 of the distributor D. The closing of the contacts 96, 100 serves in effect to condition the ignition circuit for interruption since the contact 84 of the governor switch is connected to ground 88 and grounding of the primary coil of the ignition will take place when the contacts 84, 90 are closed, assuming, of course, that the contacts 96, 100 of the relay also are closed. In the described structure, the contacts 96, 100 do not open until a predetermined time after opening of the governor switch contacts 86, 92. This predetermined time is measured by the characteristics of the relay 98. The lag or time delay between the opening of the contacts 96, 100 is effected by causing the armature 97 to seal against the core 106 of the relay when the contacts 96, 100 are closed thereby making it necessary for the magnetic flux in the core 106 to diminish to substantially zero before the armature 97 is released to open the contacts 96, 100. The decay of flux in the core 106 is retarded by the short circuited coil 110.

Consequently, when the governor contacts 86, 92 open and the governor contacts 84, 90 close the relay contacts 96, 100 will still be closed and current to the ignition system will be interrupted by grounding of the primary coil of the distributor D. The overcenter or snap action of the governor avoids hunting and reduces to a minimum the time interval between opening of contacts 86, 92 and closing of contacts 84, 90 such that the relay switch contacts 96, 100 will thereafter still remain closed for a sufficient time to effect ignition interruption. The interruption of ignition current eliminates the igniting of several fuel charges whereby the engine ceases to drive the vehicle and the torque application on the pawls 48 is relieved sufficiently to facilitate their retraction by the springs 68. It will be understood that the governor contacts 84, 90 will preferably close at that vehicle speed at which the pawls 48 of the centrifugal clutch would be normally retracted by the springs 68 were it not for the torque application on the pawls. This will generally be at a vehicle speed of approximately 10–11 M. P. H. corresponding to an engine speed of 500 R. P. M. in direct speed ratio drive.

As soon as the magnetic flux in the core 106 has decayed sufficiently the armature of the relay 98 will be released to reopen the contacts 96, 100 and thereby re-establish the ignition circuit thereby permitting normal functioning of the engine.

As stated above, the time of delay in the release of the armature 97 should be sufficient to permit the governor contacts 84, 90 to close and the ignition be interrupted for an interval enough to permit the pawls to disengage. In actual practice it has been determined that an interval between $\tfrac{3}{10}$ to $\tfrac{5}{10}$ of a second will suffice.

It will be apparent from the foregoing description that I have provided electro-magnetic means operating independently of the centrifugal pawl mechanism for interrupting the ignition system of the engine to retract the pawls of the clutch at such time as they would normally be expected to release. If desired, the manual switch 118 may be omitted and the conductors 112, 128 be connected by a conductor 148, as seen in Figure 1A.

In Fig. 2 I have shown a control arrangement for the transmission of Fig. 1 which is substantially the same as that of Fig. 1 except that the speed governor function is provided by a centrifugal force type dummy pawl 150 which simulates the action of the pawl 48 of the transmission clutch but does not engage with the shell 52. Preferably, the pawl 150 will be carried on the pawl carrying member 50 so that it is subject to the same centrifugal force conditions as the pawls 48.

When the pawls 48 move outwardly under the action of centrifugal force, a similar movement will be made by the pawl 150 and at such time as the pawl 48 should be capable of engagement upon momentary release of the throttle the pawl 150 will close the contacts 86ª, 92ª of a switch 152 corresponding respectively to that provided by the contacts 86, 92 of the governor switch in Fig. 1. Moreover, when the vehicle speed drops to that speed at which the pawls 48 should disengage were it not for the torque application thereon, the pawl 150 being free of the shell 52 may readily retract and upon doing so, will close the contacts 84ª, 90ª of a switch 154 corresponding respectively, to the contacts 84, 90 of the governor switch of Fig. 1. In Fig. 2, the contact 90ª is connected to the ground 88 by a conductor 156. It will be understood that suitable conductor slip rings may be provided for the contacts 86ª, 92ª, 84ª, and 90ª to facilitate the various electrical connections during operation of the transmission. It will also be apparent that with the arrangement in Fig. 2, better timing of pawl retraction is facilitated.

In Fig. 3 control mechanism for obtaining release of the pawls 48 of the transmission of Fig. 1 is disclosed wherein such control means includes a measured time delay relay 98 similar to that in Fig. 1 but wherein the ignition interruption and restoration functions are respectively controlled by a dummy pawl 150 and a pawl 48 of the centrifugal clutch itself. In this arrangement the energizing coil 108 of the relay is connected with the switch 152 contact 92ª through manual switch 118 by the conductors 112, 114, and 128. The other side of the relay winding is connected to the source of current 140 as in Figs. 1 and 2. The switch 154 operated by the dummy pawl 150 has its contact 90ª grounded as at 88 through the conductor 156 and its contact 84ª connected by a conductor 94ª with the contact 100 of the time delay relay 98. The contact 96 of the relay is connected through a switch 158 to the primary coil contact terminal 104 of the distributor D. The contact 160 of the switch 158 is connected by a conductor 162 with the contact 96 of the relay, and the contact 164 of the switch 158 is connected to the terminal 104 by a conductor 166.

The switch 158 is adapted to be closed by a finger 167 of the pawl 48 upon engagement of the pawl 48 in the slot 54 of the shell 52 of the centrifugal clutch and to open upon disengagement of the pawl 48. The switches 152, 154 function similar to those in the Fig. 2 arrangement. Thus the switch 152 closes at or above the predetermined vehicle speed, for example, 12 M. P. H. at which the pawls 48 may become engaged with the shell 52. The switch 154 will close when that predetermined speed of the vehicle is reached wherein the pawls 48 are adapted to be retracted by the springs 68 in which case the spring 68 of the dummy pawl 150 will retract the pawl 150 to open the switch 152 and close the switch 154.

In operation of the circuit in Fig. 3, closing of the switch 152 will energize the winding 108 of the relay 98 to close the contacts 96, 100 and bring the armature 97 of the relay into contact with the core 106. When the dummy pawl 150 retracts to close the switch 152 the contacts 96, 100 of the relay will be maintained closed by the short-circuited coil 110 for a measured time during which closing of the switch 154 of the dummy pawl will permit the ignition circuit to be interrupted by grounding at 88, it being noted in this connection that during this interval the switch 158 operated by the pawl 48 is still closed by reason of the pawl 48 being held engaged by the torque application thereon. As soon as the torque on pawl 48 is relieved by interruption of the ignition, the pawl 48 will retract, thus opening the switch 158 to restore the ignition system to normal operation.

The arrangement in Fig. 4 differs from that of Fig. 3 in that it employs an ordinary relay in place of a measured time relay and the relay circuit is actuated and the period of closing of the relay switch is controlled by a switch operated by the pawl 48. One side of relay winding 108$^a$ is connected to ground 142 in the same manner as coil 108 of Fig. 3. The opposite side of the winding is connected by conductors 128, 126 to the manual control switch 118. Switch 118 connects with a switch 170 which is closed by the pawl 48 upon engagement thereof with the shell 52 and is opened when this pawl is retracted. The switch 170 has a contact 172 connected to the switch 118 by a conductor 174 and has a second contact 176 grounded as at 178. The relay 98$^a$ has a contact 96$^a$ carried by its armature 97$^a$ which is connected by a conductor 162 to the contact 160 of a switch 158, a second contact 164 of which is connected by a conductor 166 to the primary coil terminal 104 of the distributor. This switch 158 is also closed when the pawl 48 is engaged as in the case of a similar switch in the Fig. 3 arrangement and is opened when the pawl 48 is retracted. The second contact 100$^a$ of the relay is connected by a conductor 94$^a$ to the switch 154 operated by the dummy pawl 150 as in the case of the Fig. 3 circuit, this switch having a contact 84$^a$ connected to the conductor 94$^a$ and a contact 90$^a$ connected to ground 88 through a conductor 156.

The Fig. 4 circuit operates as follows: when the pawl 48 is moved outwardly under centrifugal force at or above the speed at which it is adapted to become engageable with the shell 56, the dummy pawl 150 will likewise move outwardly to open the switch 154 which is normally closed when the pawl 150 is in retracted position. As soon as the pawl 48 becomes engaged with the shell 52, the switches 170 and 158 will each be closed. Closing of the switch 170 will complete a circuit through the winding 108$^a$ of the relay to energize this winding and cause the armature 97$^a$ to be drawn towards the core 106$^a$ to close the contacts 96$^a$, 100$^a$ of switch 95$^a$ to condition the ignition circuit for interruption at such time as the switch 154 under control of the dummy pawl 150 is closed. This will occur when the vehicle speed has dropped to a predetermined speed at or below which the pawls 48 would disengage were it not for the torque application thereon. When this speed is reached the pawl 150 will be retracted to close the switch 154 and interrupt the ignition of the engine by grounding the same through the ground 88. The ignition will remain interrupted until the torque application on the pawl 48 is relieved sufficiently to permit the spring 68 to retract the pawl 48 whereupon the switches 170 and 158 will open to restore the ignition system to normal. It will be noted that here again as in the arrangement in Fig. 3, ignition interruption is controlled by the centrifugal clutch itself, actual interruption being effected by a dummy pawl after conditioning by the actual pawl and restoring of the ignition taking place under control of the actual pawl.

In the arrangement in Fig. 5, the dummy pawl is omitted and a conventional flyball governor is employed for actuating the relay circuit which is conditioned by the pawl 48. The ignition interruption circuit which is also conditioned by the pawl 48, is actuated by the relay switch and subsequently restored by the pawl. More specifically, when the pawl 48 moves outwardly to engage the shell 56, it closes the switches 158 and 170 to condition the relay and ignition interruption circuits for operation. However, nothing happens in either circuit until the switch 180 of the governor mechanism closes at or below the predetermined speed at which the pawls 48 would disengage were it not for the torque application thereon, which speed, as previously indicated, is around 10 to 11 M. P. H. Upon closing of the switch 180, a circuit is established through the relay winding 108$^a$ thereby energizing the relay to draw the armature 97$^a$ toward the core 106$^a$ and close the switch 95$^a$ of the relay, this resulting in grounding of the ignition system of the engine since contact 100$^a$ of the relay switch 95$^a$ is connected to the primary terminal 104 of the distributor and contact 96$^a$ of the relay switch is connected by the conductor 183 to the switch 158 which then being closed grounds the circuit through the ground 178. As soon as the pawl 48 is released from engagement with the shell 52, the switches 158 and 170 will open and the ignition system will be restored to normal operation.

The arrangement in Fig. 6 is similar to that of Fig. 5 with the difference that it omits the switch 158 of the ignition interruption circuit and permits the relay switch 95$^a$ to directly interrupt the ignition when the same is closed by energizing of winding 108$^a$ through closing of the governor switch 180; the switch 170 of the pawl 48 mechanism being at that time closed. When the pawls are released the switch 170 will open to deenergize the relay winding 108$^a$ and permit the switch 95$^a$ of the relay to open to thereby restore the ignition.

In Fig. 7, a simple control circuiting is shown wherein a pawl 48 is employed for conditioning the ignition interruption circuit and such circuit is actuated by a switch of a speed responsive governor which closes at or below the speed at which the pawls 48 would release were it not for the torque application thereon. As shown, the switch 170 of the pawl 48 has its contact 172 connected to a ground 184 by a conductor 186 and has its contact 176 connected to the manual switch 118, one side of which is connected to the contact 182 of the governor switch 180 by a conductor 188. The contact 181 of the switch 180 is connected by a conductor 190 to the primary terminal 104 of the distributor. In operation of this circuit, engagement of the pawl 48 of the centrifugal clutch will close the switch 170 connecting the ground through this switch and the manual switch 118 up to the switch 180 of the governor 72. No grounding of the ignition, however, will result since at this time the switch 180 is open. As soon as the vehicle speed drops to that speed at which disengagement of the pawls should take place, the governor switch 180 will close completing the circuiting between ground and primary coil of the distributor mechanism whereupon the ignition will be interrupted and the torque on the pawls 48 relieve such that the same may be retracted by the springs 68. As soon as the pawls 48 are released, the switch 170 will open to restore the ignition to normal operation.

The arrangement in Fig. 8 is similar to that in Fig. 7 with the exception that a dummy pawl 150 is employed instead of the governor 72 to operate the switch 180, this arrangement providing a more accurate control since the pawl 150 simulates the action of the pawls 48 and thereby effects ignition interruption to relieve the torque on the pawls 48 exactly at that vehicle speed at which the pawls 48 would retract were it not for the torque thereon. As in the case of the Fig. 7 control mechanism, closing of the switch 180 will effect ignition interruption and opening of the switch 170 will restore the same.

In Figs. 9, 10, and 11 I have shown two arrangements for effecting ignition interruption and restoring the same by the pawl 48 of the centrifugal clutch itself without the use of any other mechanism. In each of these arrangements the pawl 48 has its head portion 200 provided with a telescoping cap 202 of rectangular section which is adapted to engage in the slot 54 of the shell 52.

The cap is made of sufficient depth such that it retains engagement with the pawl carrier 50 when it becomes engaged in the shell slot 54. In this connection it should be noted that regardless of whether the shell or pawl carrier is the driving member, no torque will be transmitted between the pawl and cap, there being sufficient clearance provided between the head portion 200 of the pawl at the sides thereof and the cap to prevent drive between these members. Note also that the cap 202 has no side contact with the tail portion 203 of the opposite pawl, the carrier 50 being cut away as at 201 to receive the tail 203. In the retracted or disengaged position of the pawl 200, as seen in Fig. 9, the cap 202 is held against the head 200 by suitable means, for example, a tension spring 204, one end of the spring being connected to a hook 206 attached to the cap 202 and the other end to a cross pin or bar 208 in the body of the pawl, this structure being more specifically shown in Figs. 10 and 11. It will be understood that each of the pawls may be provided with a similar cap portion for the purpose of obtaining balance in the clutch mechanism but in certain arrangements, for example, that in Fig. 11 the cap may be omitted as to one pawl if desired. It will also be evident that when the pawl has moved outwardly under centrifugal force to engage the shell 52 that the cap 202 will be retained in engagement with the shell so long as the pawl body 200 keeps it out and as long as torque application is applied to the cap by the shell 52 or pawl carrier 50. The arrangement is such that at the vehicle speed at which the pawls would normally retract, the body portion 200 of the pawls will move inwardly toward disengaged position together with the cap 202 but if there be any torque application on the cap 202 it will remain engaged with the shell and its body portion 200 will move inwardly toward retracted position independently of the cap 202.

It will be observed that in Fig. 10 the cap 202 is provided with a bevelled edge 210 and the body portion 200 has a projecting lip 211 formed with a complementary face 212 which substantially abuts the face 210 of the cap 202 when the latter is seated on the head portion 200 of the pawl by the spring 204. The projection 211 serves as a stop for a ring or shoe 213. The ring has a curved and annular face 214. It is preferably mounted as by the member 215 for rotation with the clutch mechanism but may be desired to a stationary ring. A resilient finger member or spring 216 biases the shoe toward the pawl. The shoe 213 carries an insulated ring 218 adapted to contact a plunger 220 of a switch 222 which is normally held open in the position of the shoe 214 as shown in Fig. 10, but which may be closed when the shoe 214 moves between the faces 210 and 212 of the pawl structure. As seen, the switch 222 also includes a casing 224, a contact 226 connected through the manual switch 118 to ground 227 and a contact 230 connected by a conductor 232 to the primary coil terminal 104 of the distributor. When during operation of the clutch mechanism the pawl body 200 moves toward retracted position while the cap 202 remains engaged with the shell, the faces 210, 212 will become separated and the shoe 213 under urging of the spring 216 will move between these faces. At this time a cross bar 234 on the plunger 220 of the switch mechanism moves to the left under bias of the spring 236 to bridge and contact the contacts 226, 230 to complete a circuit between the primary coil of the ignition system and the ground 228 to thereby interrupt the ignition by grounding. As soon as the torque on the cap 202 is relieved, the cap 202 will be retracted by the spring 204 and in so doing its face 210 which is at an angle to the shoe 214, will act on the face 214 of the shoe to cam the shoe 214 away from the pawl and will act on the switch plunger 220 to open the switch 222 and thereby restore the ignition system to normal operation.

In the construction of Fig. 11 the head portion 200 of the pawl 48 is provided with a strap-like generally U-shaped contact plate 240 suitably insulated from the pawl 48 and which straddles a spring contact member 242 suitably grounded at 243 through the pawl cap 202 and shell 52. As seen, the contact 242 projects radially inwardly toward the clutch axis beneath the contact bar 240 and in the disengaged position of the pawl 48 shown (the cap 202 being seated against the head portion of the pawl) the contact 242 will be engaged from the bar 240. The bar 240 is constantly contacted by a conductor shoe 244 preferably in the form of a continuous ring and supported by a stationary finger-like spring member 246 which urges the contact shoe into contact with the bar 240. The shoe 244 is electrically connected in circuit with the spring 246 in circuit with a manual switch 118, one side of which is connected by a conductor 248 with the primary terminal 104 of the distributor D.

It will be evident that in operation of the structure of Fig. 11, when the pawl cap moves outwardly into engagement with the shell 52, the switch formed by the contact bar 240 and spring contact 244 will remain disengaged, since the cap and pawl body 200 move together. When the predetermined speed of the vehicle at or below which the pawls 48 are adapted to be retracted by the springs 68 is reached, the head portion of the pawls 48 will be retracted with the cap 202. However, if there be torque application at such time against the cap 202, it will remain engaged in the slot 54 of the shell while the body 200 of the pawl is retracted. During retraction of the pawl body the contact bar 240, which is carried by the former, will move into wiping contact with the spring contact 242 to complete the circuit between ground and primary coil of the ignition to interrupt the ignition, it being assumed that at such time the manual switch 118 is closed. As soon as the torque application on the cap 202 is relieved sufficiently, the spring 204 will retract the cap to seat the same against the head portion of the pawl and to restore the elements of the ignition interruption switch to their normal relationship shown in Fig. 11 with the spring contact 242 disengaged from the bar 240 to thereby restore the ignition to normal operation.

In Figs. 12 and 13 I have illustrated further mechanism embodying features of the previously described circuits for effecting disengagement of the pawls of a centrifugal force type clutch as in the transmission of Fig. 1 at the vehicle speed at which the pawls are to be disengaged. This embodiment of my invention also provides means for a manually controlled kickdown or overrule operation of the engaged pawls above the speed at which they are normally disengageable, by relieving torque on the pawls at the driver's will and simultaneously causing the pawls to forcibly retract against the action of centrifugal force.

As seen in Fig. 12, the numeral 250 is a measured time delay relay, the winding 108 of which is connected by conductors 254, 256 in series with an ammeter A and ignition switch 138 and a source of electrical power, for instance, a battery 140, the negative terminal of which is grounded as at 142. The other side of the coil is connected by a conductor 258 with a terminal 260 of a double pole two-position snap switch 262. A second terminal 264 which may be bridged into electrical circuit with the contact terminal 260 by a contact bar 266 of the switch 262 is connected by a conductor 268 with the contact 270 of the high speed switch 272 of a suitable governor 274 for example, similar to the governor 72 shown in Fig. 1. The switch 272 has a second contact 276 carried by the arm 278 thereof fulcrumed at 280 with which it may contact at or above a predetermined vehicle speed at which the pawls of the clutch are adapted to be engaged.

The governor has a low speed switch 282 comprising a contact 284 carried by the switch arm 278 and a second contact 286 which is connected by a conductor 288 connected to the contact terminal 290 of the kickdown switching mechanism 262. Diagonally opposite the contact 290 is a contact terminal 292 which is grounded as at 294.

The contacts 290, 292 may be bridged by the bar 266 to bring ground 294 to the low speed governor switch when the switch 262 is in its kickdown position indicated by the dot and dash position of the bar 266. When the relay coil 108 is energized the armature 97 thereof is pulled against the core 106 and closes two switches 296, 298. Switch 296 comprises terminals 297, 300 which are bridged by armature bar 302. Switch 298 comprises terminals 304, 306 bridged by armature bar 308. Terminal 298 connects by a conductor 310 with a resistance R, which is connected in series with the primary terminal 104 of the distributor D. Terminals 300, 306 are connected by a conductor 312 with the manual switch 118 previously referred to and which is in series with contact terminal 290 of the switch 262. With switches 118 and 296 closed and the switch 262 in kickdown position, ground 294 will be brought to the primary coil of the distributor D through terminal 104. Relay terminal 304 is connected by a conductor 314 with one end of the winding 316 of an electromagnetic device such as a solenoid 318 having a movable core 320. The other end of the winding 316 is connected by conductor 256 to the source of current 140.

In parallel with the relay winding is an anti-stall coil 146 of the conventional type associated with the engine carburetor for protecting the engine against stalling upon restoration of the ignition system following its interruption.

The short circuited coil 110 operates as in the Fig. 1 system to delay opening of switches 296, 298 upon de-energization of the core 108, the armature being held by the core 106 until the magnetic flux diminishes to substantially zero thus delaying opening of the switches 296, 298 even though the winding 108 is de-energized.

The kickdown switch 262 is operated by a lever 322 through a link 324 connected with the accelerator pedal 326 normally held in its up or released position by a spring 328. The lever 322 has a forked end 330 which receives between its prongs the operating finger 332 of the switch. The lever 322 also connects by a lost motion linkage 334 with the throttle valve operating lever 336. Lost motion is also available between the finger 332 and the lever 322 and is preferably arranged such that the throttle lever 336 will be in wide open throttle position against the pin 338 before the lever 322 picks up the finger 332 of the snap switch. Consequently, operation of the switch occurs during lost motion operation of the linkage 334. Lost motion will also preferably be provided between the lever 322 and switch finger 332 before the switch is returned to its normal position by release of the accelerator pedal. This has the advantage of permitting a part throttle condition to be obtained while the transmission is maintained in its kickdown ratio.

The solenoid core 320 controls operation of a mechanical pawl releasing or retracting mechanism generally designated by the numeral 340 which does not form part of my invention but is the invention of one Carl Breer as shown in his application about to be filed. This mechanism comprises, for example, a bell crank lever 342 fulcrumed at 344, one arm of which is pivotally connected to the solenoid core 320 as at 346 and the other arm of which carries a pivotally mounted brake shoe 348 which is adapted upon energization of the solenoid 318 to be brought into braking contact with a brake drum 350 by the pull of the solenoid 316 upon the core 320. The drum 350 has a pair of opposite, angularly inclined slots 352 in which are received pins 354 carried by the pawls 48. The drum 350 is normally rotatable with the clutch mechanism when the pawls are engaged, being driven by the pawl pins in the direction indicated by the arrow 356, the pins assuming a position at the outermost ends of the cam slots.

When the brake shoe 348 is applied to the drum a retarding action is imposed on the latter and since the pins of the pawls continue to rotate with the pawls a relative movement or rotation occurs between the brake drum 350 and pins 354 by virtue of which the pins are forced or carried to the opposite ends of their slots and as an incident thereto retract the pawls to disengaged position, it being assumed that the torque on the pawls has been relieved sufficiently when the pawls are retracted.

In describing the operation of the control system of Figs. 12 and 13, let it be assumed that the kickdown swtich 262 is in the position shown in Fig. 12 and the ignition switch is closed, then a circuit is established from the contact 270 of the governor switch 272 through the relay coil 108 to the battery 140. However, no current will flow to the coil since the switch 272 is open. Moreover, the solenoid 318 will be de-energized and the ignition system will be functioning in the normal manner. As the vehicle is accelerated, a speed will be reached at which the pawls 48 may become engaged on momentary release of the accelerator. The governor switch 272 will then close completing the relay coil circuit. Current will flow through coil 108 actuating the relay and closing switches 296, 298 thus conditioning the ignition interruption and kickdown circuits for actuation.

When the vehicle speed drops to or below the disengaging speed of the pawls the governor switch 272 will open and governor switch 282 will close. This will immediately impress a ground on the circuit to the primary ignition coil, this circuit having previously been conditioned by actuation of the relay switch 296. The ignition system will thereupon be interrupted, this effecting a diminution of torque, if any, on the pawls 48. When the relay switch 298 closed it conditioned the solenoid 318 circuit for actuation and when the governor switch 282 closed it caused the solenoid coil 316 to be energized to actuate the brake 348. Hence, simultaneously with relief of torque on the pawls 48 they are forcibly retracted by the brake drum 50. It will be understood that when the governor switch 272 opened the relay coil 108 becomes de-energized but because of the short-circuited coil 110 the decay of flux in the coil 106 was retarded so that the relay armature would not release to open the switches until after the governor switch 284 was closed to effect ignition interruption and pawl release. As soon as the armature 97 is released by the relay core the ignition system will be restored to normal and the brake 348 is released.

During operation of the transmission it may be desirable at times when additional acceleration is required as for passing another car to downshift the transmission by disengaging the pawls even though the pawls be above their engaging speed. With the present control arrangement this is accomplished by the operator depressing the accelerator pedal to a predetermined position, for example, in the illustrated arrangement beyond wide open throttle position. In this operation the switch bar 266 bridges the contacts 290, 292 impressing a ground 294 upon the primary coil of the ignition and effecting energization of the solenoid 318 to operate the brake 348 to cause the pawls to be mechanically retracted to disengaged position. Moreover, when the contacts 290, 292 are bridged, the circuit between contacts 260, 264 is opened to thereby de-energize the relay coil 108. As previously stated, the short circuited coil 110 delays release of the armature 97 so that the relay switches remain closed for a sufficient interval of time to effect kickdown after which they open to restore the ignition system and de-energize the solenoid 316 to effect release of the brake shoe 348. Upon release of the kickdown switch by release of the accelerator to substantially closed throttle position, high speed may again be established by re-engaging the pawls release of the accelerator permitting the shell and pawls to be synchronized in speed.

The purpose of the resistance R between the terminal 298 of the relay distributor primary terminal 104 is to prevent a feed back of the winding 108 energizing current to the distributor through the solenoid 318 winding and switches 298, 296 after the relay winding is initially energized to close the relay switches.

The circuiting in Fig. 13 is the same as that of Fig. 12 with the exception that the relay switch 296 is omitted and the resistance R and terminal 104 of the distributor are directly connected to the conductor 314. With this arrangement there could be a complete circuit between the primary coil of the ignition and the battery 140 through the kickdown solenoid winding 316. However, the resistance R and inductance of coil 316 are sufficient to prevent the solenoid 318 from being energized, or to effect the ignition.

From the above description, it will be seen that I have provided a novel mechanism and system for obtaining release of the pawls of a centrifugal clutch at such times as they would normally be expected to become disengaged and have also provided means for controlling the forced disengagement of the pawls at the normal time that the pawls are expected to disengage or at the will of the operator.

Although the particular mechanisms and systems shown and described are well adapted for carrying out the various objects of my invention, it will be understood that various modifications, changes, and substitutions may be made without departing from the spirit thereof. For example, the control systems may readily be adapted to transmissions other than that illustrated by way of example in Fig. 1. The subject invention is, therefore, to be construed to include all such modifications, changes, and substitutions as may come within the scope of the following claims.

I claim:

1. In an automotive vehicle having an engine ignition system and a transmission including means operable to provide a relatively slow speed drive therethrough and a positive clutch engageable at or above a first predetermined vehicle speed for establishing a relatively fast speed drive therethrough, said clutch being adapted for automatic release to release said drive and permit establishment of said relatively slow speed drive at or below a second predetermined vehicle speed upon sufficient reduction of torque application on said clutch; means for controlling release of said clutch and fast speed drive at or below said second predetermined speed comprising; electrical circuit means including means operable at or above said first predetermined vehicle speed for automatically conditioning said circuit means for interrupting said ignition system, further means operable substantially at or below said second predetermined vehicle speed for actuating said circuit means to interrupt said ignition system and means operable to maintain said ignition interruption effective for an interval sufficient to allow a removal of torque on said clutch whereby said clutch may automatically release to release said fast drive.

2. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive at or below said second predetermined speed, comprising electrical circuit means including means operable at or above said first predetermined vehicle speed for automatically conditioning said circuit means for interrupting said ignition circuit, further means operable substantially at or below said second predetermined vehicle speed for actuating said circuit means to interrupt said ignition system and means operable to restore said ignition system.

3. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive at or below said second predetermined speed, comprising electrical circuit means including means operable at or above said first predetermined vehicle speed for automatically conditioning said circuit means for interrupting said ignition circuit, further means operable substantially at or below said second predetermined vehicle speed for actuating said circuit means to interrupt said ignition system and means operable to restore said ignition system as an incident to disengagement of said pawls.

4. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said clutch; means for controlling disengagement of said pawls and release of said drive at or below said second predetermined speed, comprising electrical circuit means including means operable at or above said first predetermined vehicle speed for automatically conditioning said circuit means for interrupting said ignition system, further means operable substantially at or below said second predetermined vehicle speed for actuating said circuit means to interrupt said ignition system and switch means under control of a centrifugal force member for restoring said ignition system upon release of said pawls.

5. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive at or below said second predetermined speed, comprising electrical circuit means including means operable at or above said first predetermined vehicle speed for automatically conditioning said circuit means for interrupting said ignition circuit, further means operable substantially at or below said second predetermined vehicle speed for actuating said circuit means to interrupt said ignition system and switch means under control of a pawl of said clutch for restoring said ignition system upon release of said pawl.

6. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive at or below said second predetermined speed, comprising electrical circuit means including switch means under control of a centrifugal force member simulating the movement of said pawls for interrupting said ignition system upon movement of said member to a position corresponding to the disengaged position of the clutch pawls.

7. In an automotive vehicle having an engine ignition system and a transmission including a positive clutch engageable at or above a first predetermined vehicle speed for establishing a speed ratio drive therethrough and adapted for automatic disengagement to release said drive at or below a second predetermined vehicle speed upon sufficient reduction of torque application on said clutch; means for controlling release of said clutch and drive at or below said second predetermined speed comprising a current source, a ground connection, a speed responsive governor having a pair of contact switches, one open when the other is closed, said one switch being closed at or above said first predetermined speed and said other switch being closed at or below said second predetermined speed, a relay having a normally open contact switch which is closed upon energization of said relay and having means for delaying opening of said switch when said relay is de-energized, circuit means connecting said relay in series with said current source and said one governor switch whereby the said relay may be energized when said switch is closed, and circuit means connecting said ignition system in series with said relay switch, said other governor switch and said ground connection whereby the ignition will be grounded when said relay switch and said other governor switch are closed.

8. In an automotive vehicle having an ignition system and a transmission including a positive clutch engageable at or above a first predetermined vehicle speed for establishing a speed ratio drive therethrough and adapted for automatic disengagement to release said drive at or below a second predetermined vehicle speed upon sufficient reduction of torque application on said clutch; means for controlling release of said clutch and drive at or below said second predetermined speed comprising circuit means including a pair of series arranged switches for controlling the ignition system, one of said switches adapted to be closed when the other is also closed to control interruption of said ignition whereby to obtain release of said torque application, the other adapted to be opened while said one switch is closed to control restoration of said ignition and one of said switches being operable in response to movement of a centrifugal force pawl.

9. In an automotive vehicle having an engine ignition system and a transmission including a positive clutch engageable at or above a first predetermined vehicle speed for establishing a drive therethrough and adapted for automatic disengagement at or below a second predetermined vehicle speed upon a sufficient reduction of torque application on said clutch, means for controlling release of said clutch and drive at or below said second predetermined vehicle speed comprising electrical circuit means for interrupting and restoring the engine ignition including switch means under control of a centrifugal force operated pawl means.

10. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below or second predetermined vehicle speed upon a sufficient reduction of torque application on said pawls, means for controlling release of said clutch and drive at or below said second predetermined vehicle speed comprising electrical circuit means for interrupting and restoring the engine ignition including switch means under control of a pawl of said clutch.

11. In an automotive vehicle having an engine ignition system including a primary coil and a transmission including a centrifugal force type pawl clutch, the pawls of which are engageable at or above a first predetermined vehicle speed for establishing a drive therethrough and normally adapted for automatic disengagement at or below a second lower predetermined vehicle speed upon a sufficient reduction of torque application on said pawls; means for controlling release of said clutch pawls and drive comprising an ignition interrupting switch connected in series circuit with said primary coil and governor means for controlling said switch, said governor means being set to effect actuation of said switch at said second predetermined speed and said switch when so actuated being adapted to interrupt the ignition system.

12. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a source of current, a relay having a switch, a speed responsive switch in series with said relay switch, one of said switches being operable to condition the ignition system for interruption, the other for effecting interruption, a second speed responsive switch in series with said relay for controlling the same and means for restoring the ignition after it has been interrupted.

13. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a source of current, a relay having a switch, a speed responsive switch in series with said relay switch, one of said switches being operable to condition the ignition system for interruption, the other for effecting interruption, a second speed responsive switch in series with said relay for controlling the same and means operable as an incident to release of said pawls for restoring said ignition.

14. In an automotive vehicle having an engine ignition system and a transmission including a manually operable positive clutch and a centrifugal force type wall clutch, the pawls of which are engageable at or above a first predetermined vehicle speed for establishing a drive through the transmission when said manual clutch is also engaged and adapted for automatic disengagement at or below a second predetermined vehicle speed upon a sufficient reduction of torque application on said pawls; means for controlling disengagement of said pawls and release of said drive comprising a source of current, a relay having a switch, a speed responsive switch in series with said relay switch, one of said switches being operable to condition the ignition system for interruption, the other thereof to effect interruption, a switch in series with said relay and operable in response to engagement of said manually operable clutch for controlling said relay, a further speed responsive switch in series with said relay for actuating said relay following operation of said clutch switch and means for restoring the ignition following its interruption.

15. In an automotive vehicle having an engine ignition system and a transmission including a manually operable positive clutch and a centrifugal force type pawl clutch, the pawls of which are engageable at or above a first predetermined vehicle speed for establishing a drive through the transmission when said manual clutch is also engaged and adapted for automatic disengagement at or below a second predetermined vehicle speed upon a sufficient reduction of torque application on said pawls; means for controlling disengagement of said pawls and release of said drive comprising a source of current, a relay circuit including a speed responsive switch and a manually operative switch, an ignition grounding circuit including a relay switch and a further speed responsive switch and means for restoring the ignition.

16. In an automotive vehicle having an engine ignition system and a transmission including a manually operative positive clutch, and second positive clutch engageable at or above a first predetermined vehicle speed for establishing a speed ratio drive therethrough when said first mentioned clutch is engaged, said second clutch being adapted for automatic disengagement to release said drive at or below a second predetermined vehicle speed upon sufficient reduction of torque application on this clutch, means for controlling release of said second clutch and drive comprising a current source, a ground connection, a speed responsive governor having a pair of contact switches, one open when the other is closed, said one switch being closed at or above said first predetermined speed and said other switch being closed at or below said second predetermined speed, a manually operable switch operable to closing position when said first mentioned clutch is engaged and open when this clutch is disengaged, a relay having a normally open contact switch which is closed upon energization of said relay and having means for delaying opening of said switch when said relay is de-energized, circuit means connecting said relay in series with said current source, said manually operative switch, and said one governor switch whereby the said relay may be energized when said switches in said circuit are closed, and circuit means connecting said ignition system in series with said relay switch, said other governor switch and said ground connection whereby the ignition will be grounded when said switches in said circuit are closed whereby the torque on said second clutch will be reduced sufficiently to facilitate its disengagement.

17. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a source of current, a speed responsive pawl device, the pawl of which is movable outwardly at or above said first speed and movable inwardly at or below said second speed, said device having a pair of switches, one operable to close incident to said outward movement, the other operable to close incident to said inward movement, a relay having a normally open contact switch closed upon energization of said relay, a further switch closed when said pawl clutch is engaged and open when said pawl clutch is disengaged, circuit means connecting said relay in series with said current source and said one pawl device switch; and circuit means connecting said ignition system, said other pawl device switch, said relay switch and said pawl clutch switch.

18. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a source of current, a speed responsive pawl device, the pawl of which is operable outwardly at or above said first speed and movable inwardly at or below said second speed, said device having a switch operable to close incident to inward movement, a relay having a normally open contact switch closed upon energization of said relay, a pair of switches closed when said pawl clutch is engaged and open when said pawl clutch is disengaged, circuit means connecting said relay in series with said current source, one of said pawl clutch switches and said pawl device switch and circuit means connecting said ignition system, said other pawl clutch switch and said relay switch.

19. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a source of current, a speed responsive switch operable at or below said second speed, a relay having a normally open contact switch closed upon energization of said relay, a pair of switches closed when said pawl clutch is engaged and open when said pawl clutch is disengaged, circuit means connecting said relay in series with said current source, one of said pawl clutch switches, and said speed responsive switch, and circuit means connecting said ignition system, said relay switch and said other pawl clutch switch.

20. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a source of current, a speed responsive switch operable at or below said second speed, a relay having a normally open contact switch closed upon energization of said relay, a switch closed incident to engagement of said pawl clutch, circuit means connecting said relay in series with said current source, said pawl clutch switch and said speed responsive switch, and circuit means connecting said ignition system and said relay switch.

21. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a speed responsive switch operable to close at or below said second predetermined speed, a switch closed incident to engagement of said pawl clutch, and circuit means connecting said speed responsive switch, and pawl clutch switch in series with said ignition system.

22. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a speed responsive pawl device, the pawl of which is operable outwardly at or above said first speed and movable inwardly at or below said second speed, said device having a switch operable to close incident to inward movement of the pawl, a switch closed incident to engagement of said pawl clutch, and circuit means connecting said clutch device switch and said pawl clutch switch in series with said ignition system.

23. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a pawl of said clutch having a separable head and body portion resiliently connected and a switch in circuit with the ignition system, said switch being operable incident to retracting movement of said pawl body portion and operable a second time incident to retracting movement of said pawl head portion.

24. In an automotive vehicle having an engine ignition system and a transmission including a centrifugal force type pawl clutch, the pawls of which are engageable at or above a first predetermined vehicle speed for establishing a drive therethrough and adapted for automatic disengagement at or below a second predetermined vehicle speed upon a sufficient reduction of torque application on said pawls and one of which pawls has relatively movable portions; means for controlling disengagement of said pawls and release of said drive comprising a switch in series with the engine ignition, said switch being operable by one of said relatively movable portions of said one pawl to interrupt said ignition at or below said second predetermined speed and being operable by another of the said relatively movable portions of the same pawl to restore the ignition incident to disengagement of said pawl clutch.

25. In an automatic vehicle having an engine ignition system and a transmission including a centrifugal force type pawl clutch, the pawls of which are engageable with the pawl shell at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a pawl of said clutch having a body portion, a telescoping head portion for engagement with the shell spring means seating the head portion on the body portion, a switch in circuit with the ignition system, a switch operating ring intermediate the switch and said pawl and having a peripheral portion substantially on the line of joinder of the head portion and body portion, said ring being resiliently biased toward said pawl and adapted to move between said head and body portions of said pawl upon retracting movement of the body portion of the pawl while the head portion is held by torque application in engagement with the shell to thereby effect actuation of said switch from its normal position to interrupt the engine ignition and cam means on said head portion adapted to restore said switch to its normal position to thereby restore said ignition upon retracting movement of said head portion.

26. In an automotive vehicle having an engine ignition system and a transmission including a centrifugal force type pawl clutch, the pawls of which are engageable with the pawl shell at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a pawl of said clutch having a body portion, a telescoping head portion for engagement with the shell spring means seating the head portion on the body portion, a first switch member carried by said pawl head portion, a second switch member carried by said pawl body portion, said switch members being arranged in the ignition system to control the same, said members having a normal position relative to each other when said head portion is seated on said body portion of the pawl and being movable relative to each other to a second position upon retracting movement of the body portion of the pawl while the head portion thereof is held by torque application in engagement with said shell, said switch members being in electrical contact with each other in one of said positions and being adapted to interrupt the ignition system in said second position and restore the same in said normal position.

27. In an automotive vehicle having an engine ignition system and a transmission including a centrifugal force type pawl clutch, the pawls of which are engageable with the pawl shell at or above a first predetermined vehicle speed for establishing a drive therethrough and adapted for automatic disengagement at or below a second predetermined vehicle speed upon a sufficient reduction of torque application on said pawls; means for controlling disengagement of said pawls and release of said drive comprising a pawl of said clutch having a body portion, a telescoping head portion for engagement with the shell spring means seating the head portion on the body portion, a first switch member carried by said pawl head portion, a second switch member carried by said pawl body portion, said switch members being arranged in the ignition system to control the same, said members having a normal position wherein said switch members are electrically disconnected when said pawl head portion is seated on the pawl body portion and being movable relative to each other to a second position wherein the said members are electrically connected upon retracting movement of the body portion of the pawl while the head portion thereof is held by torque application in engagement with said shell, said switch members being adapted to interrupt the ignition system when in said second position and to restore the same when in said normal position.

28. In a centrifugal force type pawl clutch wherein a pawl is adapted to connect two rotatable elements to effect a drive therebetween, a pawl member carried by one of said elements and comprising a body portion and an independent head portion for engaging the other element, said head portion being resiliently connected to said body portion whereby the body portion may retract independently of the head portion.

29. A pawl clutch as claimed in claim 28 having a switch member on said body portion and a second switch member on said head portion adapted to electrically contact said first member in one of the relative positions of the pawl body and head portions.

30. In a centrifugal force type pawl clutch mechanism, a pawl adapted to connect two rotatable elements to effect a drive therebetween, said pawl having a body portion and a separate head portion resiliently connected to the body portion whereby the two may move together to engage the head portion with the other element and the body portion may retract independently of the head portion when the latter is held in engagement with the other element by torque application thereon, a stationary ring coaxial with the clutch mechanism, said ring having a portion adapted to enter between said head and body portions of the pawl when the head portion is held by said other element and the body portion is retracted, means to move said ring as aforesaid, and means on said head portion to eject said ring upon release of said head portion from said other element.

31. An automotive transmission having a centrifugal force type pawl clutch comprising a drive pawl engageable to establish a drive between two rotatable members and which pawl is disengageable to release this drive upon sufficient diminution of torque thereon, means for controlling disengagement of said pawl comprising a dummy pawl free to move in response to centrifugal forces of sufficient amount acting thereon and to be freely retractable when said forces are removed and means operable by said dummy pawl for effecting a diminution of torque on the clutch pawl.

32. In an automotive vehicle having an engine ignition system and a transmission including a centrifugal force type pawl clutch, the pawls of which are engageable at or above a first predetermined speed for establishing a drive therethrough and adapted for disengagement at or below a second predetermined vehicle speed upon a sufficient reduction of torque application on said pawls and including means for forcibly retracting the pawls; means for controlling release of said pawls comprising electrical circuit means including switch means, means controlled by said switch means for interrupting the engine ignition at or below said second predetermined speed, means for effecting actuation of said pawl retracting means as an incident to said ignition interruption and means for controlling restoration of said ignition system.

33. In an automotive vehicle having an engine ignition system and a transmission including a centrifugal force type pawl clutch, the pawls of which are engageable at or above a first predetermined speed and are adapted for disengagement at or below a second predetermined vehicle speed upon a sufficient diminution of torque application on said pawls and having electromagnetically actuated means for forcibly retracting said pawls; means for controlling release of said pawls comprising electrical circuit means, governor means, relay means having a pair of switches which when closed condition the ignition for interruption and said pawl retracting actuating means for operation, said governor having a switch operable at or above said first predetermined speed for actuating said relay to close said switches and having a second switch operable at or below said second predetermined speed for effecting said ignition interruption and for effecting operation of said pawl retracting operating means.

34. In an automotive vehicle an engine system and a transmission including a centrifugal force type pawl clutch, the pawls of which are engageable at or above a first predetermined speed and are adapted for disengagement at or below a second predetermined vehicle speed upon a sufficient diminution of torque application on said pawls and having means for effecting forcible retraction of said pawls; means for controlling release of said pawls comprising a pair of accelerator-operable switches, a speed responsive governor having a high speed switch and a low speed switch, a relay having a field coil and a pair of switches and a solenoid for actuating said pawl retracting means, said high speed switch being in series with one of said accelerator-operable switches and said field coil, and adapted when closed to effect energization of said field coil to thereby close said relay switches, one of said relay switches being connected in series with the other of said accelerator switches and independently in series with said low speed switch, and being in series with the engine ignition system, the other of said relay switches being in series with said solenoid, said low speed switch being adapted when closed to apply a ground to the ignition system at such time as said relay switches are also closed to interrupt said ignition and effect energization of said solenoid and said other accelerator switch being adapted when closed to effect a similar result as said low speed switch but independently thereof.

35. Pawl release control means as claimed in claim 34 including a resistance coil in the circuit between said one relay switch and the engine ignition system.

36. In an automotive vehicle having an engine ignition system and a transmission including a centrifugal force type pawl clutch, the pawls of which are engageable at or above a first predetermined speed and are adapted for disengagement at or below a second predetermined vehicle speed upon a sufficient diminution of torque application on said pawls and having means for effecting forcible retraction of said pawls; means for controlling release of said pawls comprising a pair of accelerator operable switches, a speed responsive governor having a high speed switch and a low speed switch, a relay having a field coil and a switch and a solenoid for actuating said pawl retracting means, said high speed switch being in series with one of said accelerator-operable switches and said field coil and adapted when closed to effect energization of said field coil to thereby close said relay switch, said low speed switch and said other accelerator switch being each independently in series with said relay switch, said low speed switch being adapted when closed and when said relay switch is also closed to apply a ground to the ignition system to interrupt the same and simultaneously effect energization of said solenoid, and other said accelerator switch being adapted when closed to effect a similar result as said low speed switch but independently thereof.

37. In an automotive vehicle having an engine ignition system, a source of electrical power, a transmission having a dog clutch and electromagnetic means for controlling disengagement of said clutch; a control system for controlling said electromagnetic means and ignition system comprising a first switch means having a ground connection, a second switch means closed when said clutch is engaged, circuit means between said first and second switch means, circuit means between said second switch means and said ignition system and between said second switch means and said electromagnetic means, circuit means between said electromagnetic means and said power source, said first and second switch means being adapted when closed to apply a ground to said ignition system to interrupt the same and substantially simultaneously to complete the circuit between said source and electromagnetic means to cause energization of said electromagnetic means to effect disengagement of said clutch, and an electrical resistance in the circuiting between said second switch means and ignition system.

38. In a centrifugal type pawl clutch, a rotatable shell having a slot for receiving a pawl, a rotatable pawl carrying member, a pawl carried by said member, said pawl including a body portion movable outwardly in response to centrifugal force, spring means for retracting said body portion, a cap carried by said body portion and guided by said member so as to be rotatable therewith, resilient means operable between said body portion and cap to seat said cap thereon, said cap being movable outwardly with said body portion and being adapted to enter said slot to clutch said shell and member in drive, there being clearance between side portions of said cap and body portion whereby torque transmitted between said shell and member through said cap will not be impressed on said body portion.

39. In a centrifugal type pawl clutch a rotatable shell having a slot for receiving a pawl, a rotatable pawl carrying member, a pawl carried by said member, said pawl including a body portion movable outwardly in response to centrifugal force, means for retracting said body portion, a cap carried by said body portion and guided by said member so as to be rotatable therewith, a resilient connection between said cap and body portion, said cap being movable outwardly with said body portion and being adapted to enter said slot to clutch said shell and member in drive and said resilient connection permitting said body portion to be retracted independently of said cap when sufficient torque application exists between said cap and one of said shell and member.

40. A variable speed power transmission for driving a motor vehicle comprising a change speed mechanism including interengageable means operable between a disengaged position for establishing one speed ratio drive through said mechanism and an engaged position for establishing a different speed ratio drive therethrough, a first speed responsive control means for selectively controlling the said speed ratio drive establishing positioning operations of said interengageable means, said first speed responsive control means being operable for effecting said engaged positioning operation of said interengageable means at or above one predetermined vehicle speed and for mobilizing said interengageable means for said disengaged positioning operation at a predetermined vehicle speed which is lower than said one predetermined speed, and a second speed responsive control means operable for controlling the said disengaged positioning operation of said interengageable means in conjunction with said first speed responsive control means, said second speed responsive control means operating at a vehicle speed approximately the same as but not greater than said lower predetermined speed to effectuate said disengaged positioning operation of said interengaged means which said first speed responsive control means has mobilized whereby to change the speed ratio drive through said mechanism from said different speed ratio drive to said one speed ratio drive.

41. A variable speed power transmission for driving a motor vehicle comprising a change speed mechanism including a centrifugal pawl clutch element operable between a position disengaged from another engageable clutch element for establishing one speed ratio drive through said mechanism and a position engaged with said other clutch element for establishing a different speed ratio drive therethrough, a first speed responsive control means including a spring, for selectively controlling the said speed ratio drive establishing positioning operations of said pawl clutch element, said first speed responsive control means being operable for effecting said engaged positioning operation of said pawl clutch element at or above one predetermined vehicle speed and for mobilizing said pawl clutch element for said disengaged positioning operation at a predetermined speed which is lower than said one predetermined speed, and a second speed responsive control means operable for controlling the said disengaged positioning operation of said pawl clutch element in conjunction with said first speed responsive control means, said second speed responsive control means operating at a vehicle speed approximately the same as but not greater than said lower predetermined speed to effectuate said disengaged positioning operation of said pawl clutch element which said first speed responsive control means has mobilized whereby to change the speed ratio drive through said mechanism from said different speed ratio drive to said one speed ratio drive.

42. A variable speed power transmission for driving a motor vehicle comprising a change speed mechanism including interengageable means operable between a disengaged position for establishing a relatively slow speed ratio drive through said mechanism and an engaged position for establishing relatively fast speed ratio drive therethrough, a first speed responsive control means for selectively controlling the said speed ratio drive establishing positioning operations of said interengageable means, said first speed responsive control means being operable for effecting said engaged positioning operation of said interengageable means at or above one predetermined vehicle speed and for mobilizing said interengageable means for said disengaged positioning operation at a predetermined vehicle speed which is lower than said one predetermined speed, and a second speed responsive control means operable for controlling the said disengaged positioning operation of said interengageable means in conjunction with said first speed responsive control means, said second speed responsive control means operating at a vehicle speed approximately the same as but not greater than said lower predetermined speed to effectuate said disengaged positioning operation of said interengaged means which said first speed responsive control means has mobilized whereby to change the speed ratio drive through said mechanism from said fast speed ratio drive to said slow speed ratio drive and means operable in response to operation of said second speed responsive control means for facilitating said disengaged positioning operation.

43. A variable speed power transmission for driving a motor vehicle comprising a change speed mechanism including interengageable means operable between a disengaged position for establishing one speed ratio drive through said mechanism and an engaged position for establishing a different speed ratio drive therethrough, a first speed responsive control means for selectively controlling the said speed ratio drive establishing positioning operations of said interengageable means, said first speed responsive control means being operable for effecting said engaged positioning operation of said interengageable means at a predetermined vehicle speed and for mobilizing said interengageable means for said disengaged positioning operation at a predetermined speed which is different from said first mentioned predetermined speed, a second speed responsive control means operable for controlling the said disengaged positioning operation of said interengageable means in conjunction with said first speed responsive control means, said second speed responsive control means operating at a vehicle speed approximately the same as said different predetermined speed to effectuate said disengaged positioning operation of said interengaged means which said first responsive control means has mobilized whereby to change the speed ratio drive through said mechanism from said different speed ratio drive to said one speed ratio drive and means operable in response to operation of said second speed responsive control means when effectuating said disengaged positioning operation of said interengageable means for facilitating the latter operation.

LOUIS B. FORMAN.

(References on following page)

REFERENCES CITED

The following references are of record in the file of this patent:

UNITED STATES PATENTS

| Number | Name | Date |
|---|---|---|
| 2,225,493 | Barnes | Dec. 17, 1940 |
| 2,236,657 | Webb | Apr. 1, 1941 |
| 2,241,632 | Claytor | May 13, 1941 |
| 2,257,674 | Dunn | Sept. 30, 1941 |
| 2,257,838 | Claytor | Oct. 7, 1941 |
| 2,267,603 | Claytor | Dec. 23, 1941 |
| 2,306,865 | Claytor | Dec. 29, 1942 |
| 2,309,468 | Matulaitis | Jan. 26, 1943 |
| 2,319,746 | Orr | May 18, 1943 |
| 2,328,291 | Osborne | Aug. 31, 1943 |